Aug. 5, 1969     I. KATVA     3,459,223
MIXING VALVE
Filed March 8, 1967     2 Sheets-Sheet 1
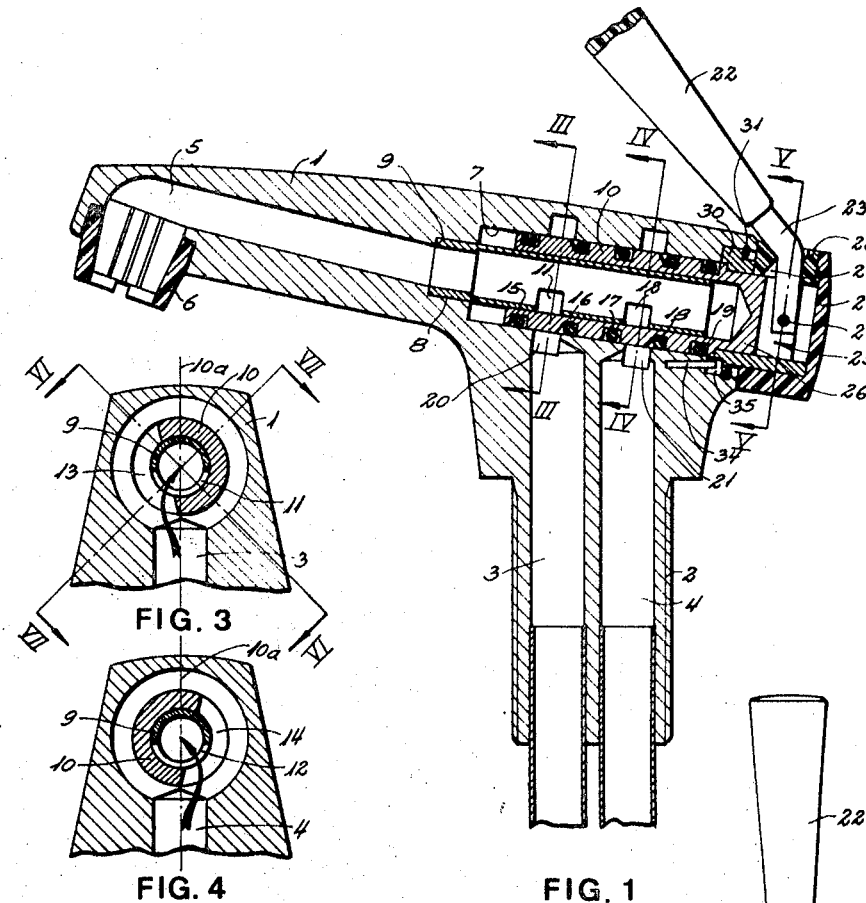
FIG. 1
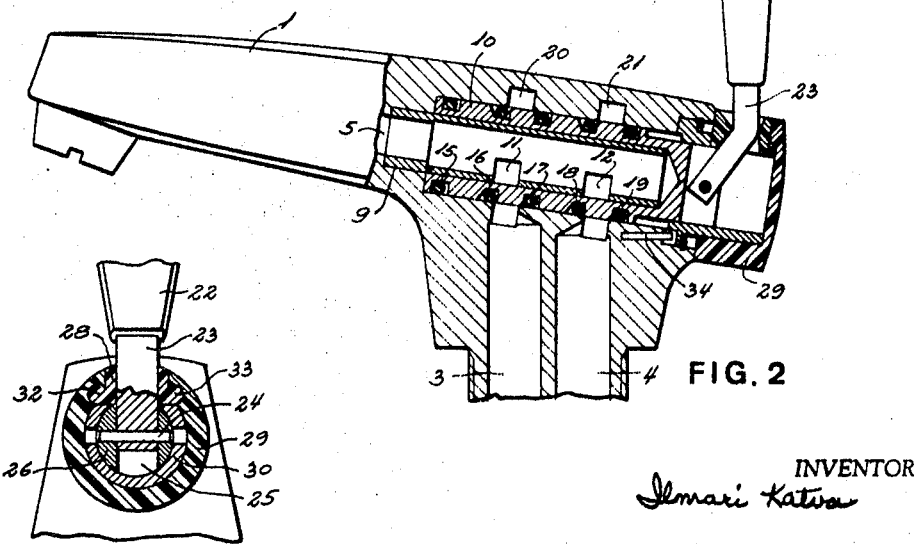
FIG. 3
FIG. 4
FIG. 2
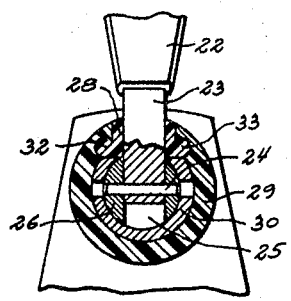
FIG. 5
INVENTOR
Ilmari Katva
BY Watson, Cole, Grindle & Watson
ATTORNEYS Aug. 5, 1969   I. KATVA   3,459,223
MIXING VALVE Filed March 8, 1967   2 Sheets-Sheet 2

INVENTOR
Ilmari Katva

BY Watson, Cole, Grindle + Watson
ATTORNEYS

United States Patent Office 3,459,223
Patented Aug. 5, 1969

3,459,223
MIXING VALVE
Ilmari Katva, Faurskov, near Gelsted, Funen, Denmark, assignor to Broen Armatur I/S, Assens, Funen, Denmark
Filed Mar. 8, 1967, Ser. No. 621,656
Claims priority, application Denmark, Mar. 11, 1966, 1,273/66
Int. Cl. F16k *11/18*
U.S. Cl. 137—625.17    3 Claims

ABSTRACT OF THE DISCLOSURE

A mixing valve for hot and cold water, in which a cylindrical sleeve is slidably and rotatably mounted in a bore of a valve housing with two inlets and one outlet and surrounds a stationary hollow plug, the sleeve and the plug having co-operating circumferentially extending ports for controlling the total rate of flow and the mixing proportion by axial and rotational movement of the sleeve respectively, a plurality of O-rings establishing sealing zones between the sleeve and the wall of the bore.

Background of the invention

This invention relates to a mixing valve for hot and cold water or water and steam, said valve comprising a housing having two inlets, a slide and a plug in said housing, said slide and said plug being both axially movable and rotatable relative to one another to control the total rate of flow and the relative proportion of the two media respectively, said plug having a flow passage provided therein.

A mixing valve of this kind is known in which the slide is composed of two valve bodies, which are moved by means of a common handle, each of the valve bodies having a concave cylindrical surface for engagement with the plug.

In this known valve, the valve bodies may be moved relative to the plug in such a manner as to obtain a gradual increase of the total rate of flow without substantially influencing the mixing proportion, i.e. the relative proportion of the two media, or conversely a gradual variation of the mixing proportion without substantially changing the total rate of flow.

It is the object of the present invention to devise a valve of improved and simplified construction, in which the said advantages in respect of control of the rate of flow and the mixing proportion are maintained.

Summary of the invention

According to the invention the slide is in the form of a sleeve surrounding the plug at a sliding fit, two axially spaced ports being provided in the wall of said sleeve for co-operation with correspondingly axially spaced ports of the plug, the sleeve being at least axially displaceably mounted in a bore of the housing, the two inlets opening into axially spaced recesses in the wall of the bore of the housing, circumferentially extending sealing means being provided between the sleeve and the wall of the bore of the housing, said sealing means being so constructed and arranged as to provide a seal both between said recesses and on the remote sides of these in the closed position of the valve.

By virtue of the features recited, a simplification of the known valve has been obtained in that the two valve bodies have been combined into a single sleeve. At the same time the very important property that the valve directly closes the inlets has been maintained so that there is no necessity of using non-return valves for preventing flow or leakage from one of the inlets to the other in the closed position of the valve.

Moreover, the new mixing valve offers a great flexibility in respect of its manner of operation. Thus, it will be understood that the control of the rate of flow is caused by axially displacing the sleeve relative to the plug, while the control of the mixing proportion may be caused by rotating the sleeve relative to the plug or the plug relative to the sleeve. It is observed, however, that in the preferred embodiment of the invention the former alternative is preferred. In this emobdiment, the plug is fixedly mounted in the housing while the sleeve is axially displaceable and rotatable relative to the plug by means of a handle, one end of which is pivotably connected with the sleeve and which extends through and is pivotably supported in an opening of a cap rotatably mounted on the housing. In this manner the rate of flow and the mixing proportion are controlled by means of a single handle.

Brief description of the drawings

FIG. 1 shows a vertical section through a mixing valve according to one embodiment of the invention in open position, FIG. 2 a fraction of the section shown in FIG. 1, but in the closed position of the valve, FIGS. 3, 4 and 5 sections along the lines III—III, IV—IV and V—V in FIG. 1, and FIGS. 6 and 7 fractional sections along the lines VI—VI and VII—VII in FIG. 3.

Description of the preferred embodiment

Figure 6:
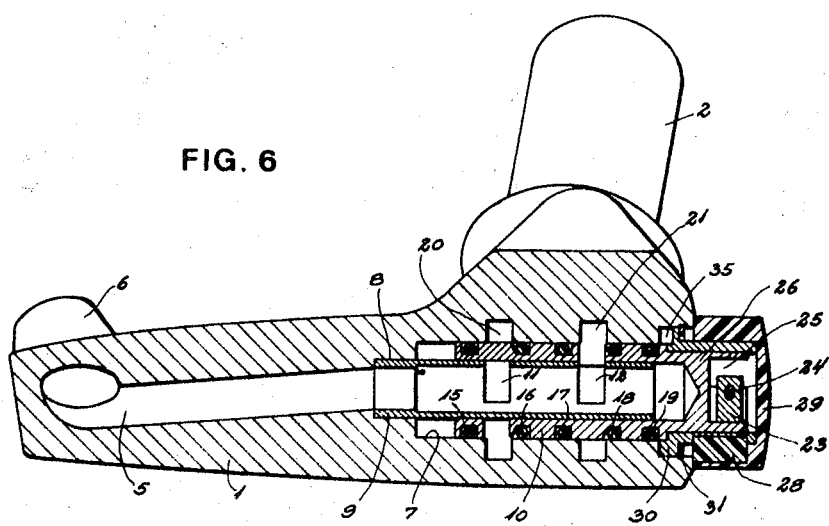
Figure 7:
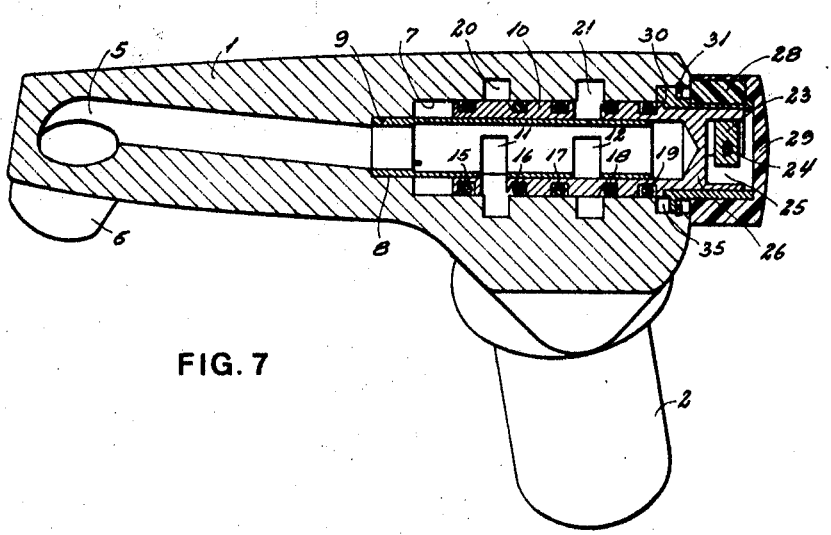

In FIG. 1, 1 is a housing which is constructed with a stem portion 2, in which two inlets 3 and 4 for hot and cold water respectively are provided. The valve housing 1 has an outlet 5 at the end of which a nozzle 6 is inserted. The two inlets 3 and 4 terminate in the wall of a bore 7 of the valve housing. At the end of the bore 7 this is constructed with a reduced portion 8, in which one end of a cylindrical plug 9 is firmly held. The outer diameter of the plug 9 is smaller than the diameter of the bore 7, and in the space between the free portion of the plug and the wall of the bore a sleeve 10 is inserted. The plug 9 is hollow and two axially spaced ports 11 and 12 are provided in its wall. In the embodiment shown, these ports are located in axially aligned positions and each extends through approximately 180° of the circumference of the plug, such as illustrated in FIGS. 3 and 4.

The sleeve 10 also has two ports 13 and 14, such as is most clearly apparent from FIGS. 3 and 4. These ports have the same axial spacing as those of the plug, but are located on opposite sides of the sleeve, such as is apparent from FIGS. 3 and 4.

In its circumferential surface the sleeve 10 has five annular grooves 15, 16, 17, 18 and 19, in each of which a O-ring is inserted to make a seal against the wall of the bore 7. The grooves 15 and 16 are located on opposite sides of the port 13 of the sleeve 10, and the grooves 17 and 18 are located on opposite sides of the port 14 of the sleeve. The last groove 19 is located at the end of the sleeve remote from the outlet 5.

The total rate of flow and the mixing proportion are controlled by cooperation of the two sets of ports 11, 12 and 13, 14 respectively, and the water is supplied to these from the inlets 3 and 4 through annular recesses 20 and 21 in the wall of the bore 7.

In the embodiment illustrated, the sleeve 10 is mounted so as to be both axially slidable and rotatable in the space between the outer face of the plug 9 and the wall of the bore 7. These movements of the sleeve are effected by means of a handle 22, which is provided with an arm 23, the ends of which is pivotably mounted by means of a pin 24 in a slot 25 of an end portion 26 closing one end of the sleeve 10. The arm 23 extends through an opening 27 of a rocking support member 28, which is inserted in the side of a cap 29, which is rotatably mounted relative to the valve housing 1. The cap 29 is fixed at a pressing fit to a bush 30, which is axially held in the housing by means of a stop ring 31. The opening 27 of the rocking support member 28 is of generally rectangular form, one of its walls being wedge-shaped and the other being rounded, see FIGS. 1 and 2. The member 28 is secured to the cap 29 by means of anchoring beads 32 and 33, such as is apparent from FIG. 5.

The described valve operates as follows:

The control of the rate of flow is effected by a rocking movement of the handle 22, whereby its arm 23 by way of the pin 24 produces an axial movement of the sleeve 10 relative to the plug 9 and relative to the two recesses 20 and 21 terminating the inlets 3 and 4. The mixing proportion is controlled by rotating the handle 22 about the axis of the bore 7, whereby the arm 23 by way of the side walls of the slot 25 and the pin 24 rotates the sleeve 10.

In FIG. 1 the valve is shown in its fully open position with the handle 22 set for the mixing proportion 1/1, i.e. equal influx rates from the two inlets 3 and 4, the sleeve 10 having been axially moved relative to the plug 9 to such an extent that the two ports 13 and 14 of the sleeve are in line with the two ports 11 and 12 of the plug. Moreover, the sleeve 10 assumes an angular position relative to the plug 9 such that the port 13 uncovers the port 11 of the plug slightly less than halfway, as is apparent from FIG. 3 and the port 14 of the sleeve uncovers the port 12 of the plug 9 slightly less than halfway, as is apparent from FIG. 4. Thus, the total passage area 4 for both media is slightly less than the area of one of the ports 11 and 12. Upon axial movement of the sleeve, this area will be narrowed because the ports 11 and 12 are axially displaced relative to the ports 13 and 14, whereby the total rate of flow decreases, but the mixing proportion is maintained, because equal areas are cut away from the lateral areas of the ports 11 and 12. Conversely, the mixing proportion may be changed without changing the total rate of flow by rotating the handle 22 as explained. Thereby the passage area through one set of ports 11 and 13 will be increased, while at the same time the passage area through the other set of ports 12 and 14 is correspondingly decreased. Thus, by turning the handle 22, the narrowing taking place at one inlet corresponds to the enlargement taking place at the other. However, the rate of flow does not vary accurately in proportion to the free passage area, but this has been compensated for by the symmetrical, but mutually inclined positions of the ports 13 and 14 relative to a median plane 10a of the sleeve 10, such as is apparent from FIGS. 3 and 4.

Since the control depends only on the co-operation between the outer surface of the plug 9 and the inner wall of the sleeve 10, it will be understood that the same control function will exist, if the sleeve 10 is axially movable and the plug 9 is rotatably mounted. In that case, it will be necessary to use two handles, but the simple sliding control between the plug 9 and the sleeve 10 is maintained.

The valve will be closed, if the sleeve 10 is rotated about 180° in the clock-wise or anti-clock-wise direction from the position shown in FIGS. 3 and 4, because in these positions there will be no overlapping of the two sets of ports. This closing of the valve is not desirable, because the rotation of the sleeve beyond the point at which one set of ports are in registering positions will result in a reduction of the rate of flow. Therefore, a pin 34 is provided, one end of which is secured to the valve housing 1 and the other end of which engages a groove 35 of the bush 30. The groove 35 extends through about 180° of the circumference of the bush.

A definitive and positive closing of the valve is effected by the O-rings in the grooves 15, 16, 17, 18 and 19. Each inlet 20 and 21 is sealingly closed by the O-rings in the grooves 16, 17 and 18, 19, FIG. 2. In half-way open position the O-ring in the groove 17 prevents flow or leakage directly from one inlet to the other. The O-ring in the groove 19 makes a seal towards the exterior, and the O-ring in the groove 15 seals against undesirable internal leakage.

As is apparent from the drawing, notwithstanding the position of the sleeve, one O-ring will always be present on each side of the inlet recesses 20 and 21, and since the O-rings are of equal size the inlet pressure cannot act on the sleeve in the axial direction and thus the valve is balanced.

It will be understood, however, that the sealing between the sleeve 10 and the inner wall of the bore 7 may be effected in other ways, e.g. by giving the bore a stepped configuration and the sleeve 10 a matching stepped configuration so that the shoulders of the two parts thereby formed may co-operate to establish a closure between the inlets in the closed position of the valve and also a closure between the inlets and the exterior of the housing. In this case, the simple sliding movement of the sleeve can no longer be used, but it will be necessary to transfer the movement through a screw thread or the like.

I claim:

1. A mixing valve for hot and cold water or water and steam, said valve comprising a housing having two inlets, a slide and a plug in said housing, said slide and said plug being both axially movable and rotatable relative to one another to control the total rate of flow and the relative proportion of the two media respectively, said plug having a flow passage provided therein, characterized in that the slide is in the form of a sleeve surrounding the plug at a sliding fit, two axially spaced ports being provided in the wall of said sleeve for co-operation with correspondingly axially spaced ports of the plug, the sleeve being at least axially displaceably mounted in a bore of the housing, the two inlets opening into axially spaced recesses in the wall of the bore of the housing, circumferentially extending sealing means being provided between the sleeve and the wall of the bore of the housing, said sealing means being so constructed and arranged as to provide a seal both between said recesses and on the remote sides of these in the closed position of the valve, and said plug being fixedly mounted in said housing while said sleeve is axially displaceable and rotatable relative to said plug by means of a handle, one end of which is pivotably connected with said sleeve and which extends through and is pivotably supported in an opening of a cap rotatably mounted on said housing.

2. A mixing valve for hot and cold water or water and steam, said valve comprising a housing having two inlets, a slide and a plug in said housing, said slide and said plug being both axially movable and rotatable relative to one another to control the total rate of flow and the relative proportion of the two media respectively, said plug having a flow passage provided therein, characterized in that the slide is in the form of a sleeve surrounding the plug at a sliding fit, two axially spaced ports being provided in the wall of said sleeve for co-operation with correspondingly axially spaced ports of the plug, the sleeve being at least axially displaceably mounted in a bore of the housing, the two inlets opening into axially spaced recesses in the wall of the bore of the housing, circumferentially extending sealing means being provided between the sleeve and the wall of the bore of the housing, said sealing means being so constructed and arranged as to provide a seal both between said recesses and on the remote sides of these in the closed position of the valve, the ports of said plug and said sleeve extending through approximately 180° in the circumferential direction, while the recesses, into which the inlets open, extend all the way around the cylindrical wall of the bore of said housing.

3. A mixing valve as in claim 2, in which the ports of one of the co-operating members comprising said sleeve and said plug are located in identical angular positions while the ports of the other of said members are located in angularly symmetrical positions with respect to a diametrical plane of the member in question, with their ends at some distance from the said diametrical plane.

References Cited

UNITED STATES PATENTS 1,943,865  1/1934  Hennessey ------- 137—625.17
3,338,267  8/1967  Weaver ---------- 137—625.17

WALTER A. SCHEEL, Primary Examiner

ROBERT I. SMITH, Assistant Examiner